June 2, 1931.  H. A. PHILLIPS  1,808,374
REFRIGERATING APPARATUS
Filed Nov. 26, 1928   2 Sheets-Sheet 1

INVENTOR
HARRY ALEXANDER PHILLIPS
BY
ATTORNEYS

June 2, 1931.                H. A. PHILLIPS                1,808,374
                          REFRIGERATING APPARATUS
                           Filed Nov. 26, 1928        2 Sheets-Sheet 2
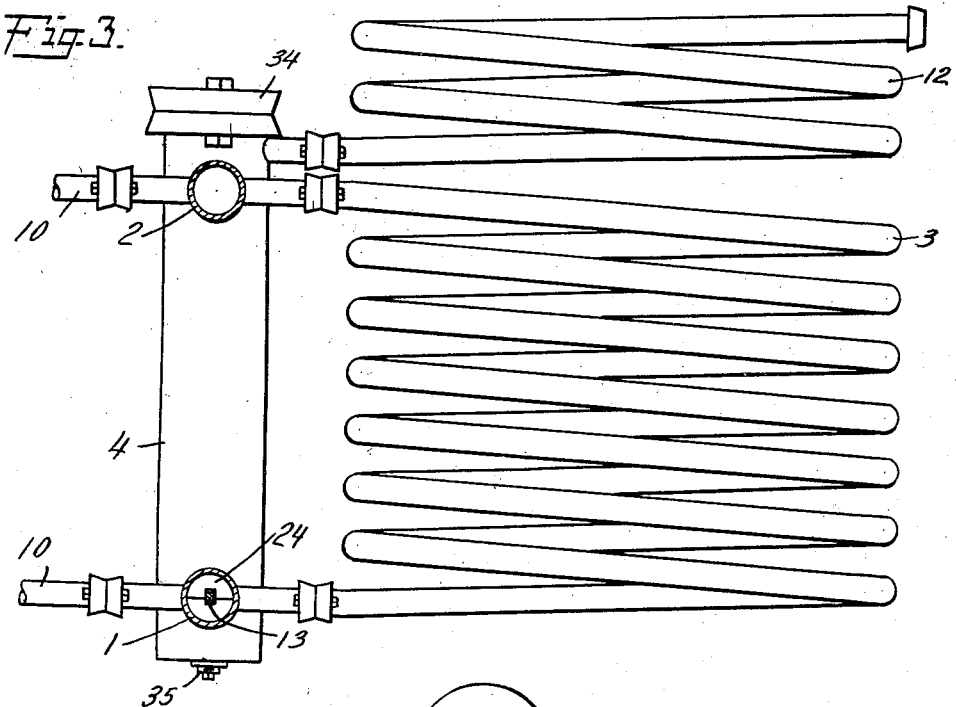
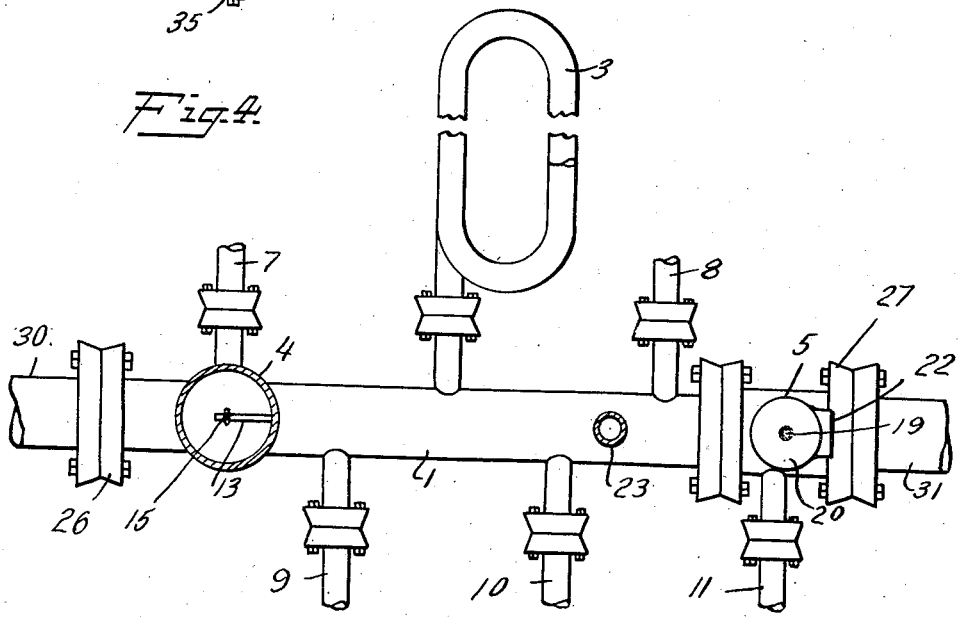
INVENTOR
Harry Alexander Phillips
BY Pennie, Davis, Marvin
ATTORNEYS Patented June 2, 1931

1,808,374

UNITED STATES PATENT OFFICE

HARRY ALEXANDER PHILLIPS, OF KNOXVILLE, TENNESSEE

REFRIGERATING APPARATUS

Application filed November 26, 1928. Serial No. 321,777.

This invention relates to refrigeration apparatus and more particularly to refrigeration units especially adapted to utilize a refrigerating medium, such as ammonia or the like.

It is the object of this invention to provide an efficient refrigeration unit especially suitable for the refrigeration of meat coolers and for other industrial purposes. My invention utilizes the principles of the flooded refrigeration system. The use of the flooded system insures efficient heat transfer from all surfaces due to the fact that the major portion of all refrigerating surfaces are in direct contact with liquid refrigerant and all refrigerating surfaces are effective during the operating period. Furthermore, with such a system more heat is absorbed by the refrigerant during the non-operating period than is the case with refrigeration apparatus not employing the flooded system.

A further object of this invention is the provision of an improved refrigeration unit construction of such a nature that the apparatus may be manufactured in sectional form. In other words, it is an object of my invention to provide a construction which may be readily standardized in the form of sectional units which may be readily attached, one to another, for the purpose of building up a composite refrigeration system of any desired capacity.

In general this invention comprises liquid and gas headers, expansion coils communicating with these headers, a valve for controlling the admission of refrigerant to the liquid header and a float for regulating the valve so as to maintain a predetermined liquid level in the apparatus. I prefer to locate the valve at a point remote from the float and in this way avoid erratic operation of the float due to the action of such refrigerant as may be converted into a gaseous state upon passing through the valve. I not only prefer to locate the valve at a point remote from the float but I also prefer to provide means for preventing such gaseous refrigerant in the liquid header from entering either the float chamber or the expansion coils and I provide a by-pass connection for passing such gaseous refrigerant around the coils from the liquid header into the gas header. The successful and efficient operation of a refrigeration system depends in a large measure upon the degree to which disturbing conditions in the system may be eliminated and I have found that by keeping gaseous refrigerant, which has formed in the liquid header, from coming into close proximity to the float and from entering the expansion coils, efficient and stable operation of the apparatus can be effected. To further increase the efficiency of the system I prefer to construct and arrange the expansion coils in such a manner that the major portion of each coil is inclined at an angle to the horizontal, thus facilitating the escape of gas bubbles through liquid refrigerant in the coils.

The valve mechanism for controlling the admission of refrigerant to the liquid headers is preferably arranged at right angles to these headers in order to facilitate the connection of additional header sections to the unit whenever this may be desired, and I prefer to provide the valve with some conveniently located exposed adjusting device which makes it possible to adjust the valve without shutting down the system, or in any way interfering with its continued operation.

I may provide my improved apparatus with a superheater coil communicating with the gas header and serving to conduct gaseous refrigerant away from the gas header. This superheater coil may be located in close proximity to the main expansion coils and by providing such a coil it is possible to utilize the refrigerant to the best advantage.

The various objects and advantages of my invention will be more apparent upon considering the following detailed description of one embodiment of my invention as illustrated in the accompanying drawings wherein Fig. 1 is a vertical section view of an apparatus embodying my invention;

Fig. 3 is a transverse section view taken on line 3—3 of Fig. 1;

Fig. 4 is a horizontal section view of part of the apparatus shown in Fig. 1.

Figure 1:
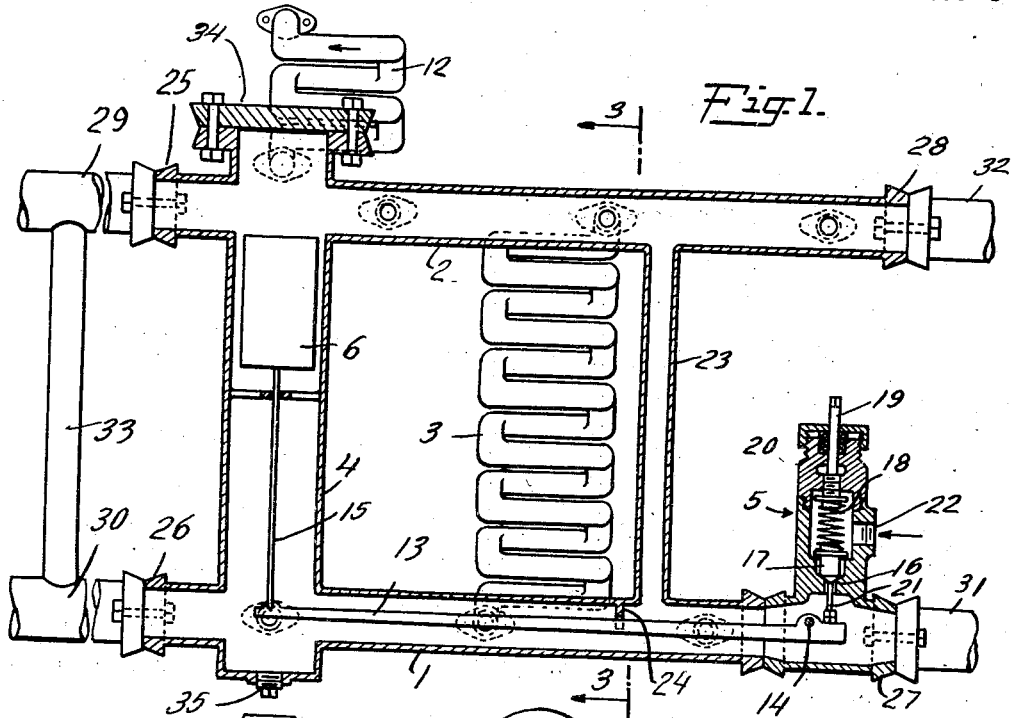
Figure 2:
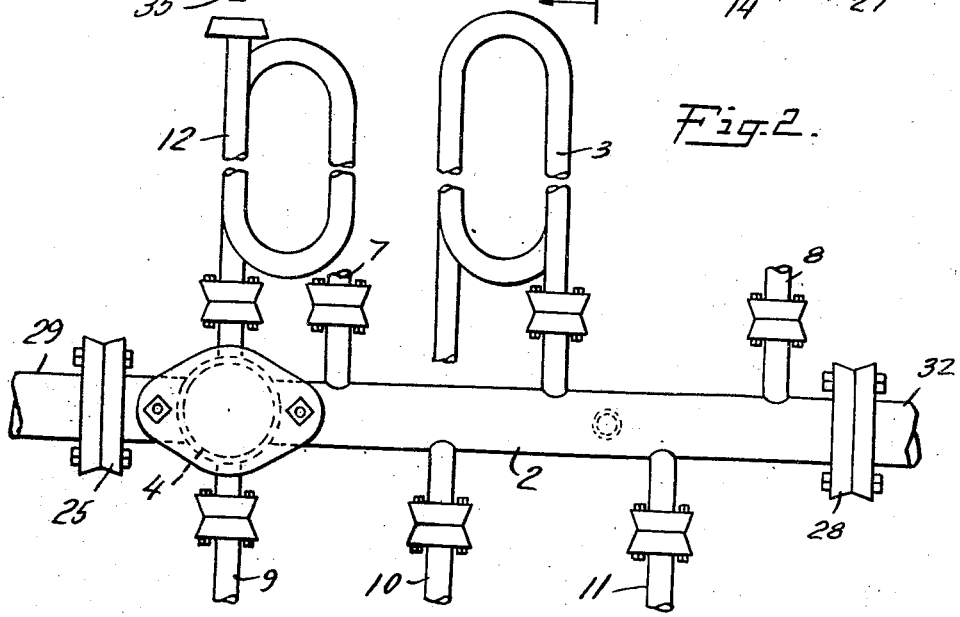
Fig. 2 is a plan view of part of the apparatus shown in Fig. 1.

The embodiment of my invention illustrated in the accompanying drawings comprises a liquid header 1, a gas header 2, an expansion coil 3 communicating with the liquid and gas headers, a float chamber 4 also communicating with the liquid and gas headers, and a control valve 5 operated by a float 6 in the float chamber 4. It will be understood that while I have illustrated only a single expansion coil 3 in Fig. 1, yet a number of such coils may be employed, as indicated at 7 and 8 in Fig. 2. Furthermore, the headers may not only be provided with one set of coils extending out to one side of the headers, but they may be also provided with a second set of coils extending out from the other side as indicated at 9, 10 and 11 in Fig. 2. It will be understood that the latter arrangement is such that the two sets of coils are connected to headers centrally located with respect to these two sets. I may also provide a superheater coil, such as that illustrated at 12, this coil communicating with the gas header and serving to conduct the gaseous refrigerant away from this header. The superheater coil 12 may be similar in construction to the main expansion coils and may be arranged in close proximity thereto. By using such a superheater coil it is possible to utilize the refrigerant to the best advantage for the gaseous refrigerant in this coil will absorb a considerable quantity of heat from the refrigeration chamber in which the apparatus is employed.

I prefer to construct the coils of my improved apparatus in such a manner that the major portion of each coil extends at an angle to the horizontal, as best illustrated in Fig. 3. This form of coil facilitates the passage of bubbles of gaseous refrigerant through the liquid refrigerant in the coils and renders the operation of the system more efficient because there is no tendency for gas pockets to form in the coils. Where the coils consist of a series of oblong or rectangular loops it is satisfactory to arrange the short bends in a substantially horizontal position with the intermediate connecting portions, or along sides of the loops extending at an angle to the horizontal.

The float 6 in the float chamber 4 controls the valve 5 by actuating a lever 13 extending throughout the major portion of the liquid header and mounted on a support 14 within this header. The float 6 is connected to the lever 13 by a suitable link, such as that indicated at 15. The valve mechanism indicated at 5 in Fig. 1 may be of any ordinary construction but I prefer to provide this mechanism with some means of adjustment whereby the valve can be adjusted without shutting down the system, or in any way interfering with its continuous operation. As illustrated in the accompanying drawings the valve mechanism comprises a valve seat 16, a valve member 17 held against the seat 16 by a spring 18. The spring tension may be adjusted by means of a screw threaded rod 19 which is provided with a stem projecting through the upper portion of the valve housing 20. This exposed stem may be adjusted as desired for the purpose of regulating the spring tension and in this way the operation of the valve may be altered to suit varying conditions. By regulating the valve it is possible to change the level of the liquid in the apparatus. A lever 13 under the control of the float 6 actuates the valve stem 21 to regulate the size of the valve opening. Liquid refrigerant, such as liquid ammonia, may be introduced into the valve housing through the inlet 22 and from the valve housing the refrigerant passes through the valve port directly into the liquid header.

The valve mechanism is preferably located at a point remote from the float chamber in order to prevent any gaseous refrigerant formed within the valve from interfering with the stable operation of the float 6. I prefer to locate the valve mechanism at one end of the liquid header and the float chamber at the other end of this header and I also prefer to provide some means for by-passing gaseous refrigerant around the expansion coils and float chamber. A by-pass or equalizing pipe 23 interconnects the liquid header and the gas header and serves to conduct gaseous refrigerant from the liquid header directly to the gas header, thus eliminating the necessity of having gaseous refrigerant formed in the liquid header pass through the expansion coils. A baffle 24 may be provided in the liquid header for preventing gaseous refrigerant formed in the vicinity of the valve mechanism from entering the expansion coils or the float chamber and this baffle may also serve the function of acting as a guide member for the lever 13.

The liquid and gas headers are preferably flanged at the ends, as illustrated at 25, 26, 27 and 28, so as to facilitate the attachment of additional header sections whenever it is desired to increase the capacity of the refrigerating unit. Such additional headers are shown at 29, 30, 31 and 32. The additional header sections may be provided with expansion coils and with equalizer or by-pass pipes, such as that shown at 33, and it will be understood that the valve mechanism 5 and the float 6 for controlling the same will serve for controlling the supply of refrigerant to all parts of the apparatus, regardless of the number of sections employed. The flanged ends of the liquid and gas headers may be closed by any suitable means in the event additional sections are not desired.

A removable plate 34 may be provided near one end of the gas header 2 and in alignment with the float chamber 4, thus permitting ready access to the float chamber whenever this may be necessary. I may provide an oil drain port normally closed by a removable cover 35, this port being located at the bottom of the liquid header and preferably in alignment with the float chamber so as to permit ready access to the link 15 connected to the float and to the adjacent end of the lever 13 connected to the link 15.

From the foregoing description it will be understood that my invention may be utilized in the form of a compact refrigeration unit capable of enlargement by the addition of refrigerator sections, the several parts being constructed and arranged in a manner to utilize a refrigerant, such as ammonia to the best advantage. My invention is not limited to the details of construction illustrated and described but includes such modifications thereof as fall within the scope of the appended claims.

I claim:

1. A refrigeration unit comprising a liquid header, a gas header, a refrigerating coil communicating with said headers, a float chamber communicating with said headers, a valve for admitting liquid refrigerant directly into said liquid header, and a float in said chamber for controlling said valve.

2. A refrigeration unit comprising a liquid header, a gas header, a refrigerating coil communicating with said headers, a float chamber communicating with said headers, a valve for admitting liquid refrigerant directly into said liquid header, and a float in said chamber for controlling said valve, said valve being located at a point remote from said float chamber.

3. A refrigeration unit comprising a liquid header, a gas header, a refrigerating coil communicating with said headers, a float chamber communicating with said gas header and with one end of said liquid header, a valve near the other end of the liquid header for admitting liquid refrigerant thereto, a float in said chamber, and means actuated by said float for controlling said valve.

4. A refrigeration unit comprising a liquid header, a gas header, a refrigerating coil communicating with said headers, a float chamber communicating with said gas header and with one end of said liquid header, means for admitting liquid refrigerant to said liquid header, means for preventing gaseous refrigerant from entering said coil from said liquid header, and means for by-passing gaseous refrigerant around said coil from the liquid header to the gas header.

5. A refrigeration unit comprising a liquid header, a gas header, a refrigerating coil communicating with said headers, a float chamber communicating with said gas header and with one end of said liquid header, means for admitting liquid refrigerant to said liquid header, a baffle in said liquid header for preventing gaseous refrigerant from entering said coil from the liquid header, and means for by-passing gaseous refrigerant around said coil from the liquid header to the gas header.

6. A refrigeration unit comprising a liquid header, a gas header, a refrigerating coil communicating with said headers, a float chamber communicating with said gas header and with one end of said liquid header, a valve near the other end of the liquid header for admitting liquid refrigerant thereto, a float in said chamber, and a by-pass connection communicating with the liquid header near said valve, and with the gas header, for by-passing gaseous refrigerant around said coil.

7. A refrigerating unit comprising a liquid header, a gas header, a refrigerating coil communicating with said headers, a float chamber communicating with said gas header and with one end of said liquid header, a valve near the other end of said liquid header for admitting liquid refrigerant thereto, a float in said chamber, a lever mounted in said liquid header for actuating said valve, a link connecting said float with said lever, and a drain port in said lever header permitting access to said lever and said link.

8. A refrigerating unit comprising a liquid header, a gas header, a refrigerating coil communicating with said headers, a float chamber communicating with said gas header and with one end of said liquid header, a valve near the other end of said liquid header for admitting liquid refrigerant thereto, a float in said chamber, a lever mounted in said liquid header for actuating said valve, a link connecting said float with said lever, a member in said liquid header for guiding said lever and for preventing gaseous refrigerant from entering said coil, and means for by-passing gaseous refrigerant around said coil from the liquid header to the gas header.

9. Sectional refrigeration apparatus comprising a plurality of interconnected gas headers, a plurality of interconnected liquid headers corresponding in number and arrangement with said gas headers, refrigerating coils communicating with the liquid and gas headers, a float chamber communicating with said liquid and gas headers, a valve for admitting refrigerant to the liquid headers, means actuated by said float for controlling said valve, and a by-pass connection between each liquid header and the corresponding gas header.

10. A refrigeration unit comprising a liquid header, a gas header located above said liquid header, a plurality of refrigerating coils communicating with said headers and arranged on one side thereof, a plurality of refrigerating coils communicating with said headers and arranged on the other side thereof, and means for admitting refrigerant to said liquid header and for conducting refrigerant away from said gas header.

11. A refrigeration unit comprising a liquid header, a gas header located above said liquid header, a plurality of refrigerating coils communicating with said headers and arranged on one side thereof, a plurality of refrigerating coils communicating with said headers and arranged on the other side thereof, a by-pass connection for by-passing gaseous refrigerant around said coils from said liquid header to said gas header, and means for admitting refrigerant to said liquid header and for conducting refrigerant away from said gas header.

12. A refrigeration unit comprising a plurality of interconnected gas headers in alignment, one with another, a plurality of interconnected liquid headers in alignment with one another and corresponding in number and arrangement with said gas headers, refrigerating coils communicating with said liquid and gas headers, valve mechanism for controlling the admission of refrigerant to said liquid headers, said mechanism being disposed at right angles to said liquid headers, and means for controlling said valve to maintain a predetermined liquid level in said unit.

13. A refrigeration unit comprising a liquid header, a gas header, a refrigerating coil communicating with said headers, a float chamber communicating with said headers, a valve for admitting liquid refrigerant directly into said liquid header, a float in said chamber for controlling said valve, and exposed means for adjusting said valve.

14. A refrigeration unit comprising a liquid header, a gas header, a refrigerating coil communicating with said headers, a float chamber communicating with said headers, means for admitting liquid refrigerant into said liquid header, a float in said chamber for controlling said means, and means for by-passing gaseous refrigerant around said float chamber from the liquid header to the gas header.

15. A refrigeration unit comprising a liquid header, a gas header, a refrigerating coil communicating with said headers, a float chamber communicating with said gas header and with said liquid header, means for admitting liquid refrigerant to said liquid heater, means for preventing gaseous refrigerant from entering the bottom of said float chamber, and means for by-passing gaseous refrigerant around said float chamber from the liquid header to the gas header.

16. A refrigeration unit comprising a liquid header, a gas header, a refrigerating element communicating with said headers, a float chamber communicating with said headers, a valve for admitting liquid refrigerant directly into said liquid header and a float in said chamber for controlling said valve.

17. A refrigerating unit comprising a liquid header, a gas header, a refrigerating element communicating with said headers, a float chamber communicating with said gas header and with one end of said liquid header, means for admitting liquid refrigerant into said liquid header, means for preventing gaseous refrigerant from entering said refrigerating element, and means for by-passing gaseous refrigerant around said element from the liquid header to the gas header.

18. A refrigerating unit comprising a liquid header, a gas header, a refrigerating element communicating with said headers, a float chamber communicating with said gas header and with said liquid header, means for admitting liquid refrigerant to said liquid header, a valve for controlling the flow of refrigerant to said liquid header, means for preventing gaseous refrigerant from passing from said valve into the bottom of said float chamber and means for by-passing gaseous refrigerant around said float chamber from the liquid header to the gas header.

In testimony whereof I affix my signature.

HARRY ALEXANDER PHILLIPS.